Patented Dec. 5, 1950

2,532,393

UNITED STATES PATENT OFFICE 2,532,393

HYDROCHLORIDES OF STREPTOMYCIN OXIME AND STREPTOMYCIN AMINE

Norman G. Brink, Princeton, and Karl Folkers, Plainfield, N. J., assignors to Merck & Co., Inc., Rahway, N. J., a corporation of New Jersey No Drawing. Application October 26, 1946, Serial No. 706,042

5 Claims. (Cl. 260—210)

This invention relates to certain new derivatives of streptomycin and to processes for preparing the same. More particularly the invention relates to nitrogenous derivatives of streptomycin hydrochloride including the oxime, the semicarbazone, and the amine hydrochloride of streptomycin hydrochloride. These new products are useful in the preparation of bactericidal agents, and in some instances show in vitro and in vivo activity against certain organisms.

In preparing the new compounds of the present invention streptomycin hydrochloride, the nitrogenous hydroxylic compound obtained as an elaboration product upon cultivation of strains of *Actinomyces griseus* in culture media, and having the empirical formula $C_{21}H_{39}N_7O_{12}.3HCl$, is used as the starting material. The streptomycin molecule contains a $=C=O$ group which undergoes changes in preparing the new compounds.

By reacting streptomycin hydrochloride in aqueous solution, preferably buffered to about pH 4, with a slight molecular excess of hydroxylamine hydrochloride, in the presence of a quantity of pyridine somewhat in excess of the amount of hydroxylamine hydrochloride, the new product streptomycin oxime trihydrochloride is obtained. This compound has the empirical formula $C_{21}H_{40}N_8O_{12}.3HCl$, and has a $=C=NOH$ group in place of the $=C=O$ group in streptomycin hydrochloride. The reaction is completed in about 12 to 14 hours at room temperature, and the product is recovered by evaporating the reaction mixture to dryness in vacuo, dissolving the residue in methanol, and adding acetone to precipitate the streptomycin oxime trihydrochloride.

Streptomycin amine tetrahydrochloride is prepared from the oxime by reacting the oxime in aqueous solution with hydrogen, at a pressure slightly more than atmospheric, in the presence of platinum oxide catalyst. When the consumption of hydrogen stops, the catalyst is filtered off and the filtrate is evaporated to dryness. The residue is then dissolved in methanol containing a little concentrated hydrochloric acid (to neutralize the newly formed amino group) and the product is precipitated by addition of acetone. This product which, after filtration and drying is recovered as a white amorphous solid, contains about 65 to 75% of streptomycin amine tetrahydrochloride, the remainder being mainly unchanged oxime. The amine has the empirical formula $C_{21}H_{42}N_8O_{11}.4HCl$, and has a $=CH-NH_2.HCl$ group in place of the $=C=O$ group of streptomycin hydrochloride.

Streptomycin semicarbazone hydrochloride is prepared from streptomycin hydrochloride by reacting with semicarbazide hydrochloride and pyridine in aqueous solution. The reaction is completed in 12 to 14 hours at room temperature, and after concentrating the reaction mixture to dryness in vacuo and dissolving the residue in methanol, the semicarbazone is precipitated by addition of acetone, and recovered as a white, amorphous solid. The semicarbazone has the empirical formula $$C_{22}H_{42}N_{10}O_{12}.3HCl$$

and contains the $=C=N.NHCONH_2$ group in place of the $=C=O$ group of streptomycin hydrochloride.

The following examples show how the new products of the present invention can be prepared, but it is to be understood that these examples are given by way of illustration and not of limitation.

Example I

A solution of 300 mg. of streptomycin hydrochloride, 28.8 mg. of hydroxylamine hydrochloride, and 45 mg. of pyridine in 9 ml. of water was allowed to stand overnight at room temperature. After removal of the solvent, the residual colorless glass was dissolved in 20 ml. of methanol and 220 ml. of acetone was added. The curdy white precipitate was centrifuged, washed with acetone, and dried. The streptomycin oxime trihydrochloride thus obtained was a white powder, weighed 270 mg., and had a rotation of  $-82°$ (c, 0.985 in water). A sample for analysis was re-precipitated from methanol containing a drop of concentrated hydrochloric acid by addition of acetone, washed with acetone, dried in vacuo, and dried in a weighing pig at 56° C.

Analysis: Calculated for $C_{21}H_{40}N_8O_{12}.3HCl$: C, 35.72; H, 6.14; N, 15.87.

Found: C, 35.67; H, 6.09; N, 15.45.

Example II

A 0.1 g. portion of streptomycin oxime trihydrochloride in 50 ml. of water was hydrogenated after addition of 0.1 g. of platinum oxide catalyst. Between two and three moles of hydrogen were used. The catalyst was removed by filtration and the filtrate evaporated to dryness in vacuo at room temperature. The residue was dissolved in 8 ml. of methanol and precipitated by the addition of 40 ml. of acetone; yield, 96 mg. of white powder. This was re-dissolved in methanol, filtered, and 0.1 ml. of concentrated hydrochloric acid added to the filtrate. The solution was promptly treated with acetone, the precipitate collected by centrifugation, washed twice with acetone, and dried in vacuo. This product is streptomycin amine tetrahydrochloride containing a small amount of unreacted oxime.

Analysis: Calculated for $C_{21}H_{42}N_8O_{11} \cdot 4HCl$: C, 34.62; H, 6.36; N, 15.38; Cl, 19.47.

Found: C, 34.17; H, 5.81; N, 15.45; Cl, 19.34.

A van Slyke amino-nitrogen determination gave an uncorrected $NH_2$—N value of 1.27%; corrected (for moisture content of the sample and low value observed in the determination of a pure known compound), 1.43%. The theoretical value for one primary amino group is 1.92%. Thus, on the basis of the amino-nitrogen determination, the product is about 74% streptomycin amine tetrahydrochloride.

*Example III*

A mixture of 400 mg. of streptomycin hydrochloride, 60 mg. of semicarbazide hydrochloride, and 55 mg. of pyridine dissolved in 10 ml. of water was allowed to stand overnight at room temperature. The solution was evaporated to dryness in vacuo, and the residue taken up in 20 ml. of methanol. The product, streptomycin semicarbazone hydrochloride, was precipitated by the addition of 220 ml. of acetone, washed with acetone, and dried in vacuo. It had a rotation of $(\alpha)_D^{25} -70°$ (c, 1.08 in water). In the in vitro assay, it was without activity at a concentration of 0.1 mg./ml.

Analysis: Calculated for $C_{22}H_{42}N_{10}O_{12} \cdot 3HCl$: C, 35.32; H, 6.06; N, 18.73.

Found: C, 35.66; H, 6.14; N, 18.16.

Modifications in the foregoing procedures can be made without departing from the spirit and scope of the invention, and we are to be limited only by the appended claims.

We claim:

1. Streptomycin oxime trihydrochloride.

2. Streptomycin amine tetrahydrochloride.

3. The process that comprises reacting streptomycin hydrochloride with hydroxylamine hydrochloride and pyridine in aqueous solution, thereby forming streptomycin oxime trihydrochloride.

4. The process that comprises reacting streptomycin oxime trihydrochloride in aqueous solution with hydrogen in the presence of platinum oxide catalyst, filtering off the catalyst, concentrating the reaction mixture to dryness, and dissolving the residue in alcoholic hydrochloric acid, thereby forming streptomycin amine tetrahydrochloride.

5. The process that comprises reacting streptomycin hydrochloride with hydroxylamine hydrochloride and pyridine in aqueous solution, recovering the streptomycin oxime trihydrochloride thus formed and reacting the same in aqueous solution with hydrogen in the presence of platinum oxide catalyst, filtering off the catalyst, concentrating the reaction mixture to dryness, and dissolving the residue in alcoholic hydrochloric acid, thereby forming streptomycin amine tetrahydrochloride.

NORMAN G. BRINK.
KARL FOLKERS.

REFERENCES CITED

The following references are of record in the file of this patent:

Shriner and Fuson, Identification of Organic Compounds, pp. 107–108 (1935), Pub. by John Wiley and Sons, New York.

Fieser and Fieser, Organic Chemistry, 1944, p. 232, Pub. by D. C. Heath and Co., Boston.

Brink, Science, vol. 102, pp. 506 to 507, November 1945.

Donovich, J. Biol. Chem., vol. 164, pp. 173–181, July 1946.